United States Patent [19]

Ma et al.

[11] Patent Number: 5,573,738
[45] Date of Patent: Nov. 12, 1996

[54] METHOD FOR REMOVING DEPLETED URANIUM FROM CONTAMINATED SOILS

[75] Inventors: Jonathan K. Ma, Henderson, Nev.;
Andrea W. Chow, Los Altos, Calif.;
Scott A. Ranger, St. George, Utah;
David W. Peters, West Cliffe, Colo.;
Ronald F. May, Las Vegas, Nev.

[73] Assignee: Lockheed Martin Corporation, Bethesda, Md.

[21] Appl. No.: 272,193

[22] Filed: Jul. 8, 1994

[51] Int. Cl.⁶ .................................. C01G 43/00
[52] U.S. Cl. ................ 423/20; 423/658.5; 134/3; 209/2
[58] Field of Search .............. 423/20, 658.5; 134/3; 405/128; 209/2

[56] References Cited

U.S. PATENT DOCUMENTS

| | | | |
|---|---|---|---|
| 4,243,638 | 1/1981 | Jackovitz et al. | 423/17 |
| 4,255,392 | 3/1981 | Chiang | 423/11 |
| 4,311,675 | 1/1982 | Stana et al. | 423/8 |
| 4,323,540 | 4/1982 | Sundar | 423/10 |
| 4,374,096 | 2/1983 | Skeaff et al. | 423/9 |
| 4,407,781 | 10/1983 | Crossley et al. | 423/15 |
| 4,425,307 | 1/1984 | De Vries | 423/20 |
| 4,454,097 | 6/1984 | Nirdosh et al. | 423/8 |
| 4,489,042 | 12/1984 | Savins et al. | 423/20 |
| 4,560,538 | 12/1985 | Yung et al. | 423/3 |
| 4,701,309 | 10/1987 | Ramachandran et al. | 423/20 |
| 4,764,353 | 8/1988 | Babjak et al. | 423/20 |
| 4,775,413 | 10/1988 | Horton et al. | 75/84.1 |
| 4,783,253 | 11/1988 | Ayres et al. | 209/2 |
| 4,880,607 | 11/1989 | Horton et al. | 423/20 |
| 5,045,240 | 9/1991 | Skriba et al. | 252/628 |
| 5,077,020 | 12/1991 | Lahoda et al. | 428/18 |
| 5,128,068 | 7/1992 | Lahoda et al. | 252/626 |
| 5,322,644 | 6/1994 | Dunn et al. | 252/626 |

FOREIGN PATENT DOCUMENTS

| | | |
|---|---|---|
| 0 116 097 | 8/1984 | European Pat. Off. . |
| 0 491 533 | 6/1992 | European Pat. Off. . |
| 0 550 221 | 7/1993 | European Pat. Off. . |

OTHER PUBLICATIONS

Teringo III, J., "Magnesium hydroxide reduces sludge/improves filtering," *Pollution Engineering*, Apr.: 7 pages (1987).

Valenti, M., "Cleaning soil without incineration," *Mechanical Engineering*, May: 50–55 (1994).

*Primary Examiner*—Ngoclan Mai
*Attorney, Agent, or Firm*—Susan T. Evans; Peter J. Dehlinger

[57] ABSTRACT

Soil, contaminated with radioactive material such as uranium, is treated to remove the radioactive contaminant. The soil is first pre-processed to remove and clean oversized particles for release back to the environment as recovered soil. Pre-processing also includes removal of metallic uranium from the soil by gravimetric separation for off-site disposal. An aqueous slurry is formed from the pre-processed feed which is fed to a mechanical separation device. Particles greater than 10 mesh are crushed to provide a uniform feed slurry. The slurry is processed in an aqueous leaching solution of sulfuric acid, hydrogen peroxide and iron to remove uranium. Particulate matter is removed from the acidic slurry; the remaining fine particulate matter is then submitted to a second-stage leaching to remove residual uranium. Uranium is recovered from the combined leaching solutions by either a two-stage precipitation process or by passage over an ion-exchange material. The process utilizes a closed loop system for process water which is reclaimed, clarified, and recirculated for reuse.

4 Claims, 11 Drawing Sheets

METHOD FOR REMOVING DEPLETED URANIUM FROM CONTAMINATED SOILS

FIELD OF THE INVENTION

The present invention relates to soil remediation, and in particular, to remediation to remove radioactive material from soil and the like.

REFERENCES

Ayres, J., et al., U.S. Pat. No. 4,783,253, issued Nov. 8, 1988.

Cotton, F.; Wilkinson, G., *Advanced Inorganic Chemistry*, John Wiley & Sons, N.Y., p 1028–1036 (1980).

Lahoda, E., et al., U.S. Pat. No. 5,128,068, issued Jul. 7, 1992.

Merrit, R. G.; *The Extractive Metallurgy of Uranium*, Colorado School of Mines Research Institute, p 59–72 (1971).

Oliver, R. H.; Flocculation-Key to More Economical Solid-Liquid Separation, *Trans. Mining AIME*, 220, 434–443 (1962).

Skriba, M., et al., U.S. Pat. No. 5,045,240, issued Sep. 3, 1991.

Teringo III, J., *Pollution Engineering*, April 1987.

Valenti, M., *Mechanical Engineering*, 116 (5):51 (1994).

BACKGROUND OF THE INVENTION

Soil contamination by radioactive material has occurred widely as a result of mining operations, nuclear power plant operation, nuclear device testing, and the like. Radioactive species commonly found in contaminated soils, ores, and other particulate matter include radium, uranium, and thorium. For example, soil contamination by heavy metal billets, such as those made of uranium, which have been used as a high density material in military or civil applications, is an important soil contamination problem.

Existing technologies for treating contaminated radioactive soils include underground storage, incineration, and soil washing. Soil washing uses both physical and chemical extraction to remove wastes, and results in a reduced volume of contaminated soil to be disposed. Many soil washing methods require large volumes of water, and are thus impractical in areas or settings where fresh water supplies are limited. In addition, the water used in the method may itself need to be decontaminated before it can be safely stored.

Conventional uranium mining technology may not be applicable to many soil remediation applications. Drawbacks of conventional uranium mining technology, when applied to remediation efforts, include the requirement of fresh process water of about 1–1.5 tons per ton of ore processed. Fine grinding to pass 28 mesh (590 micron) screens is required for most ores due to the tight inclusion of uranium minerals in the rock matrix due to tens of millions of years of geologic formation. Fine grinding generates large quantities of fines which are difficult to process. Additionally, tailing ponds are required for impoundment of wastewater generated in the process. Safety concerns surrounding the possibility of liner breakage and water seepage from the standing water remaining in the ponds, especially in certain climatic, seismic, and densely populated regions, make tailing ponds an undesirable alternative.

Reagent selection for traditional uranium mining operations is based on effectiveness and costs of chemicals in relation to yield rather than on the quality and impact of the waste generated by the process. The final stages of uranium extraction processes usually employ the extraction of uranium salts such as uranyl sulfate or uranyl nitrate from aqueous solutions by utilizing large volumes of organic solvents. Many of these solvents post health hazards for workers, and all are environmentally undesirable since they generate mixed wastes.

In contrast, the goals and objectives of a program for removing depleted uranium from contaminated soils for remediation purposes mandate a much different approach which overcomes the limitations of traditional uranium ore extraction procedures and overcomes the drawbacks of existing radioactive-material remediation techniques.

SUMMARY OF THE INVENTION

The present invention provides a method for removing uranium from particulate matter, such as soil, by forming an aqueous slurry of the contaminated soil and utilizing a two-stage leaching process to remove uranium. The contaminated soil is first subjected to a series of pretreatment steps in which the soil is sized, scrubbed, and verified for levels of radioactivity.

In the two-stage leaching procedure, uranium is first removed from the particulate matter by forming a coarse particulate slurry in an aqueous medium containing acid, hydrogen peroxide and iron. The coarse particulate matter is separated from the slurry and processed for subsequent release to the environment. Residual uranium is further leached from the remaining fine particulate fraction in a second-stage leaching by forming a slurry of the fine particulate fraction in an aqueous medium containing acid, hydrogen peroxide and iron. The fine particulate matter is separated from the slurry and processed for subsequent release to the environment as clean soil.

Uranium is recovered from the leaching-steps' supernatant solutions in either a two-stage precipitation or by passage over an ion-exchange resin. Water recovered from the uranium removal steps is recycled for use in the upstream processing steps. In particular, the water requirements are reduced by utilizing a closed loop system for process water which is reclaimed, clarified, and recirculated.

These and other needs are met by the present invention as will become more fully apparent when the following detailed description of the invention is read in conjunction with the accompanying drawings.

DETAILED DESCRIPTION OF THE INVENTION

The process of the present invention is designed for use in decontaminating particulate materials such as soils, sludges, sediments, scrap yard dust and the like, which are contaminated with radioactive materials such as radium-226, uranium-238, or thorium-232.

In a typical method, the soil material to be treated includes a mixture of rocks, soil, and metal contaminants, all of which may be contaminated and therefore require some decontamination. The general method will be described herein for decontaminating particulate material produced by ballistics tests in which penetrators filled with depleted uranium were tested for their ability to penetrate steel walls, resulting in dispersal of radioactive metal fragments such as uranium billets, fused radioactive soil mass, produced by contact of soil with hot metal fragments, surface contaminated rocks, and steel debris containing both fused and surface-contaminated particles.

It will be understood that other contaminated particulate matter, such as matter containing radioactive metal fragments or ores, fused or surface-contaminated fragments, and/or contaminated soil can be treated by the same method, with appropriate modification for handling different-size particles.

Figure 1:
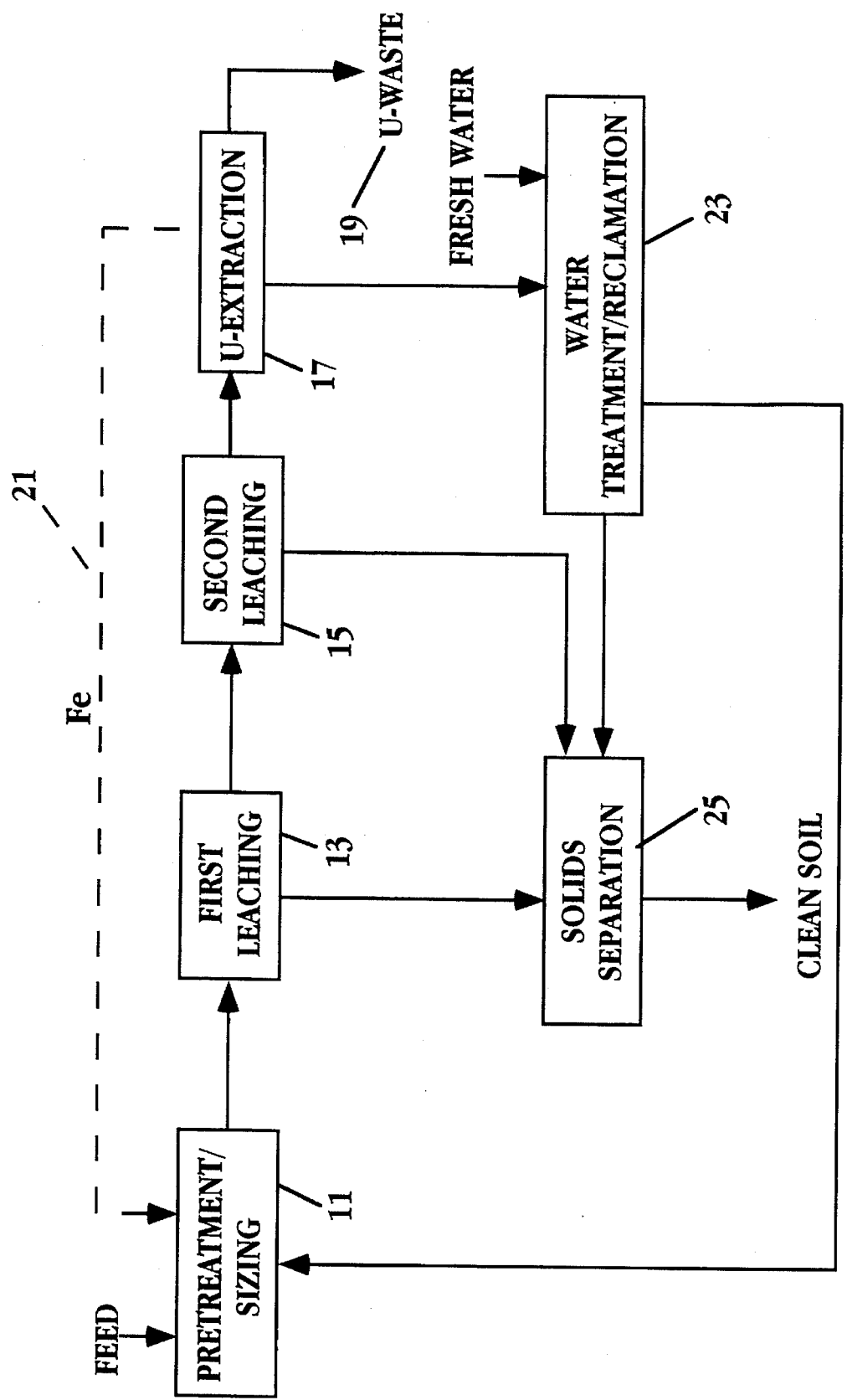
FIG. 1 is a simplified process flow diagram which illustrates methods of uranium removal in accordance with the present invention.

The overall processing scheme of the method is shown in FIG. 1. The pretreatment/sizing block 11 refers to a series of grading, scrubbing, and grinding steps used in pretreating particulate matter of the type described above to (i) remove and clean large particulates, e.g., large rocks, (ii) remove radioactive metal fragments, and grinding remaining material into particulates less than a selected size, e.g., 10 mesh. These steps will be discussed below with respect to FIGS. 2, 3 and 4. The pretreatment steps may be important to efficient practice of the present invention, but do not form essential steps in the invention as broadly contemplated.

Leaching of uranium from the pretreated particulate material, and from a fine-particle material, is accomplished, in accordance with the invention, in first and second leaching steps, respectively, shown at 13, 15 in the figure. The two leaching steps are described below with reference to FIGS. 5 and 7. The leached uranium is recovered in supernatants from each leaching step, and these supernatants, either separately or combined, are then treated to extract uranium, as indicated at 17, and the extracted material is solidified for disposal as shown at 19. Methods for extracting and disposing of uranium, in accordance with the invention, are described below with respect to FIGS. 9 and 10.

Figure 8:
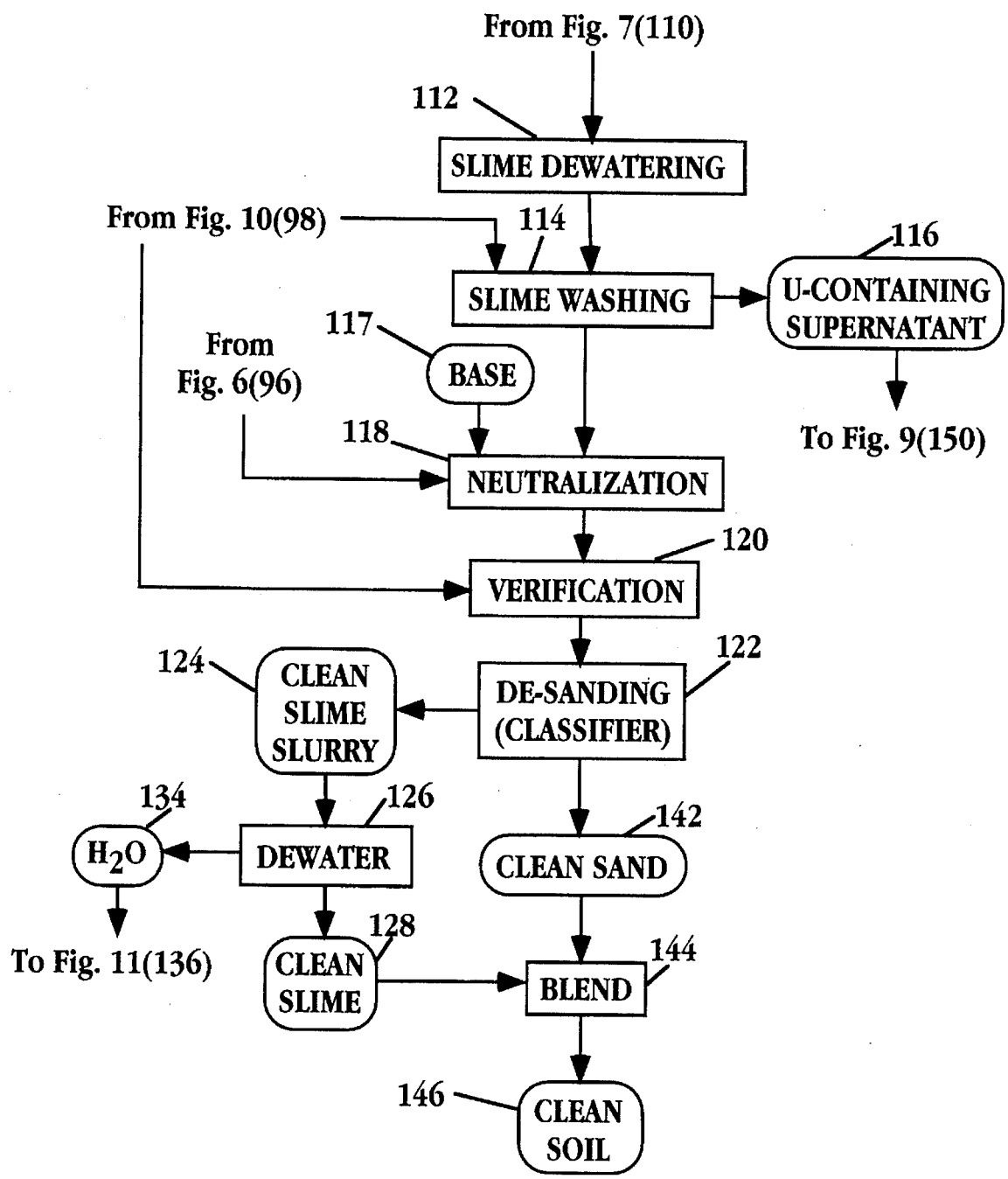
FIG. 8 is a process flow diagram showing steps in the separation of the uranium-containing supernatant from the second-stage acid leaching.
Figure 9:
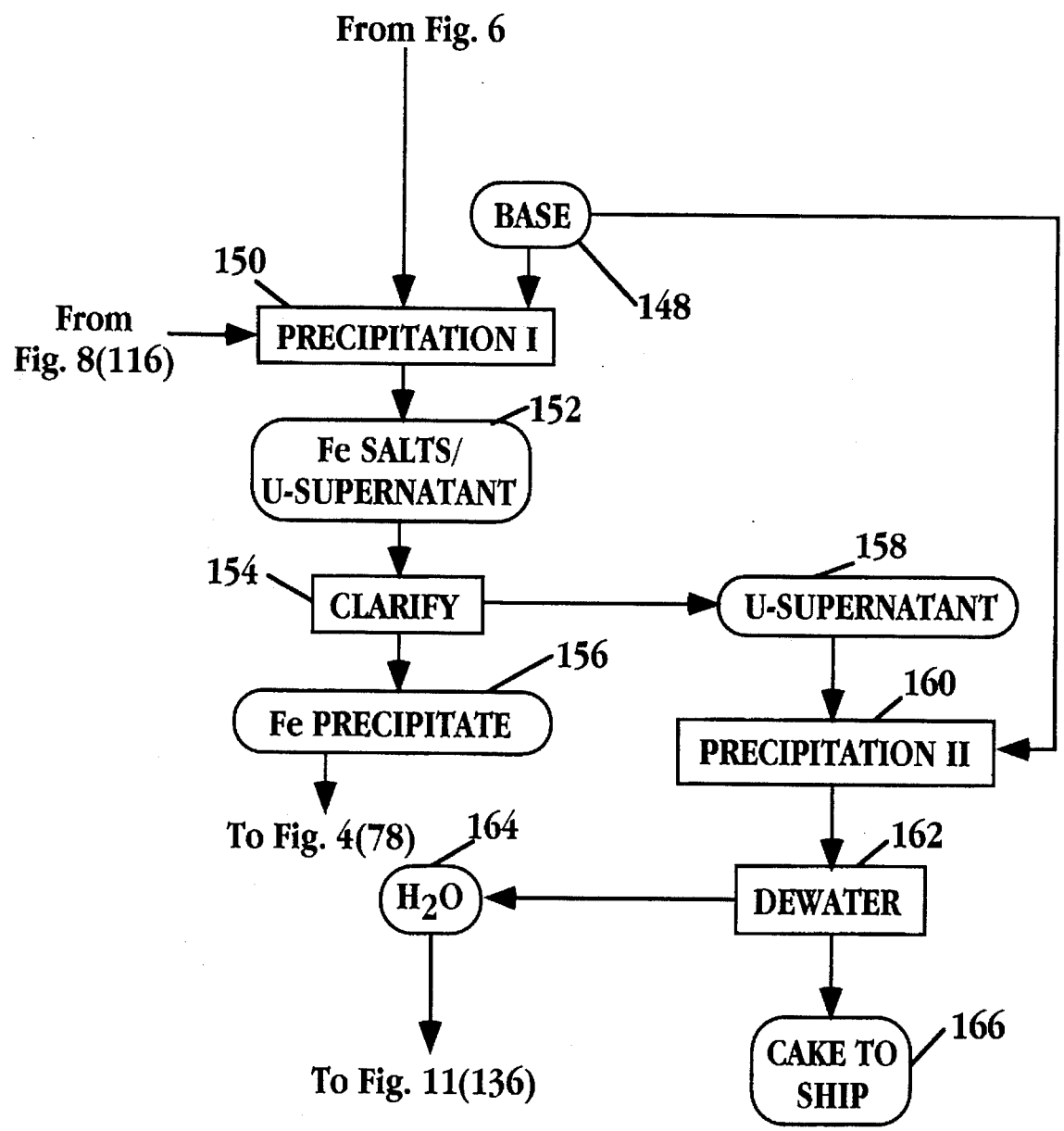
FIG. 9 is a process flow diagram showing removal of uranium from first- and second-stage leaching supernatants, in accordance with one general embodiment of the invention.

In one embodiment, described with respect to FIG. 9, the pH of the supernatants is incrementally raised, to produce selective precipitation of iron used in the leaching process, as indicated by dotted line According to an important aspect of the invention, water from the leaching and extraction steps is treated and recycled in upstream steps of the system, as shown generally at 23. The water-reclamation loop in the method is described below with respect to FIG. 11. A portion of the reclaimed water is used in solids processing, meaning solid-material washing and blending, as seen at 25, and described below with respect to FIGS. 6 and 8.

Figure 2:
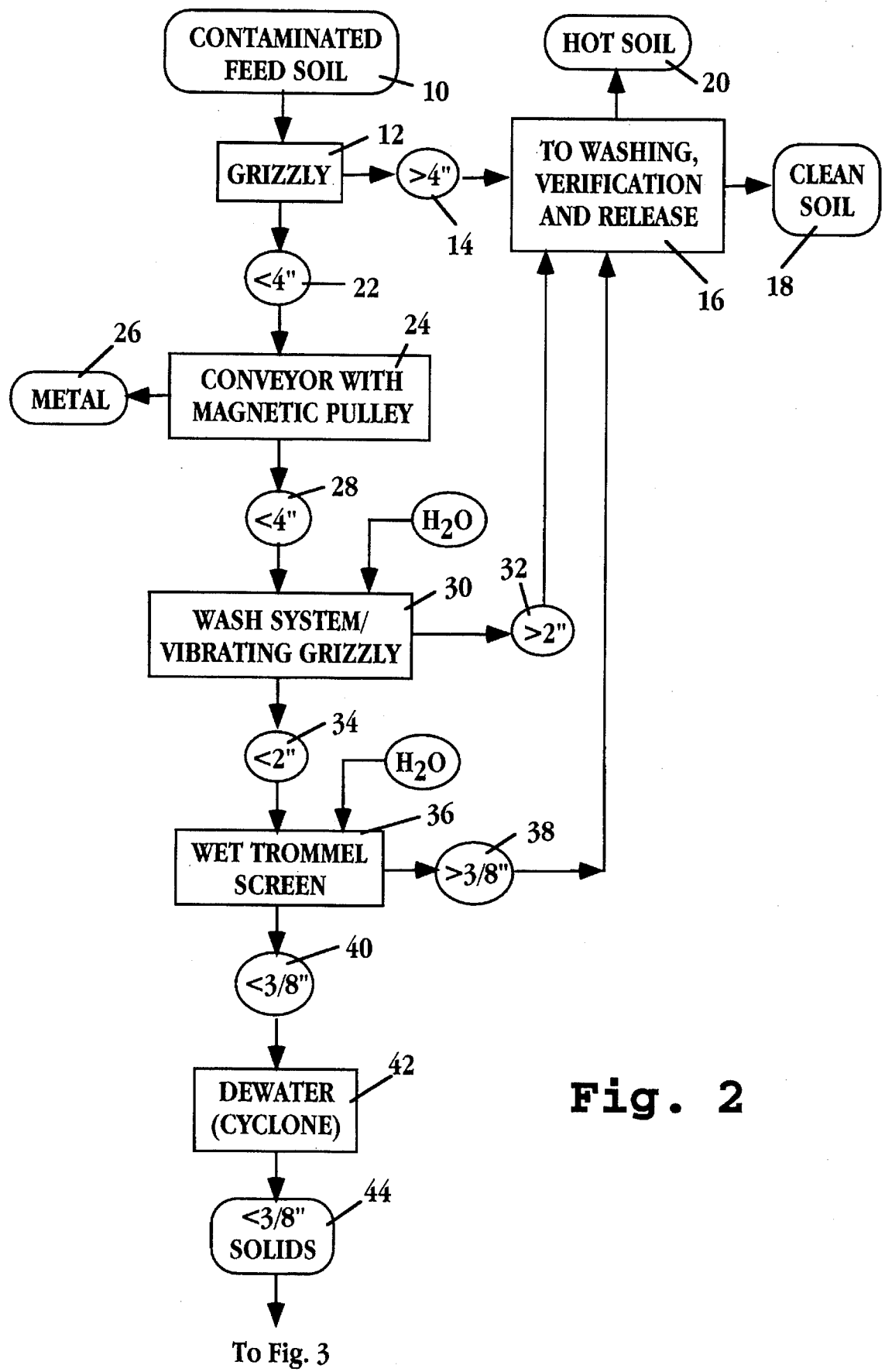
FIGS. 2 and 3 are simplified process flow diagrams which illustrate one method of pretreating contaminated soil, to prepare the soil for radioactive-material extraction in accordance with the invention.

Turning now to FIG. 2, a loader or other convenient means is used to transport contaminated particulate feed 10 to a grizzly, hopper or similar means 12 which mechanically separates particles less than 4 inches in size 22 from larger particles 14. The larger particles are then cleaned by physical methods, such as high speed water jet washing to remove uranium contaminates from the surface of the rocks. Prior to release to the environment 18, the cleaned particles may be verified as containing safe levels of radioactivity (to levels below 35 pCi/g) 16 using a radiation scanner, such as for example, a sodium iodide gamma ray detector. Radioactive scanning may be carried out at any of a number of stages in the process and may be performed by hand or automated, depending on the volume of the analyte.

Large particles with levels of radioactivity exceeding 35 pCi/g 20 may be appropriately disposed of or may optionally be submitted to an additional washing with high speed water jets.

More generally, and for purposes of verifying radioactivity levels at various processing stages throughout, the material being verified is directed onto a conveyer where a spreader bar is maintained at a predetermined elevation above the conveyer and spreads the solid material to a substantially uniform thickness for exposure to radioactive detection means. Preferably, the thickness of the layer of spread material is not greater than about 6 inches. Radioactive contaminants remaining in the soil are detected on the conveyor by scintillation detectors as the soil is passed along the conveyor belt. A detector housing is provided with the radiation detectors; one or more detectors may be used. Suitable detectors are preferably low energy radiation probes operating in an energy range of between about 13 and 24 Kev.

The detectors continually scan the moving layer of soil passing beneath the housing and detect radioactive contamination. When radioactive material is detected, a signal passes to a controller which will operate a drive mechanism for a flop gate or the like. When the gate is lowered, it passes through the layer of soil on the conveyor and deflects the soil off of the belt and into a suitable container. Any kind of container may be used for receiving the radioactive material; similarly, any other equivalent means for removing detected radioactive soil and directing it to an appropriate collection vehicle may be used. Additionally, the flop gate means or any other method for removing contaminated soil from the conveyor may be operated automatically or manually. After radioactive material is no longer sensed, the flop gate is raised and the clean soil passed on to the end of the conveyor, where it is recovered.

With reference to FIG. 2, the smaller particulate feed 22 is further sorted by transport by a conveyor utilizing a magnetic pulley 24 which serves as a magnetic separator to separate tramp metal 26 from the sample. The feed is then washed by mixing with a water-based mobilizing solution to form a slurry and passed through a particle separator such as a vibrating sieving device such as a vibrating grizzly, or a rotating drum, which further passes soil particles of a nominal size of under 2 inches 34 from those with sizes greater than 2 inches Particles greater than 2 inches in size are submitted to high speed water jet washing, verification, and release 16 as described above. In the embodiment of the soil pretreatment process shown in FIG. 2, particles less than 2 inches in size are further separated by a wet trommel screen 36 and mixed with water to form a slurry of particles of less than ⅜ inches in size 40 and further processed. Particles sized greater than ⅜ inches in size 38 are submitted to high speed water jet washing, verification, and release 16.

The smaller materials (e.g., ⅜ inch size and below) are subjected to a series of gravitational separations to remove large metallic uranium particles to thereby avoid overloading the subsequent chemical leaching process. In one aspect of the invention, the slurry of undersize materials 40 is supplied to a cyclone for dewatering 42 to provide a thickened cyclone underflow to increase the attrition effect. The dewatered solids 44 are abraded in one or more attrition scrubbers 46 to dislodge mineral slime or fines.

Figure 3:
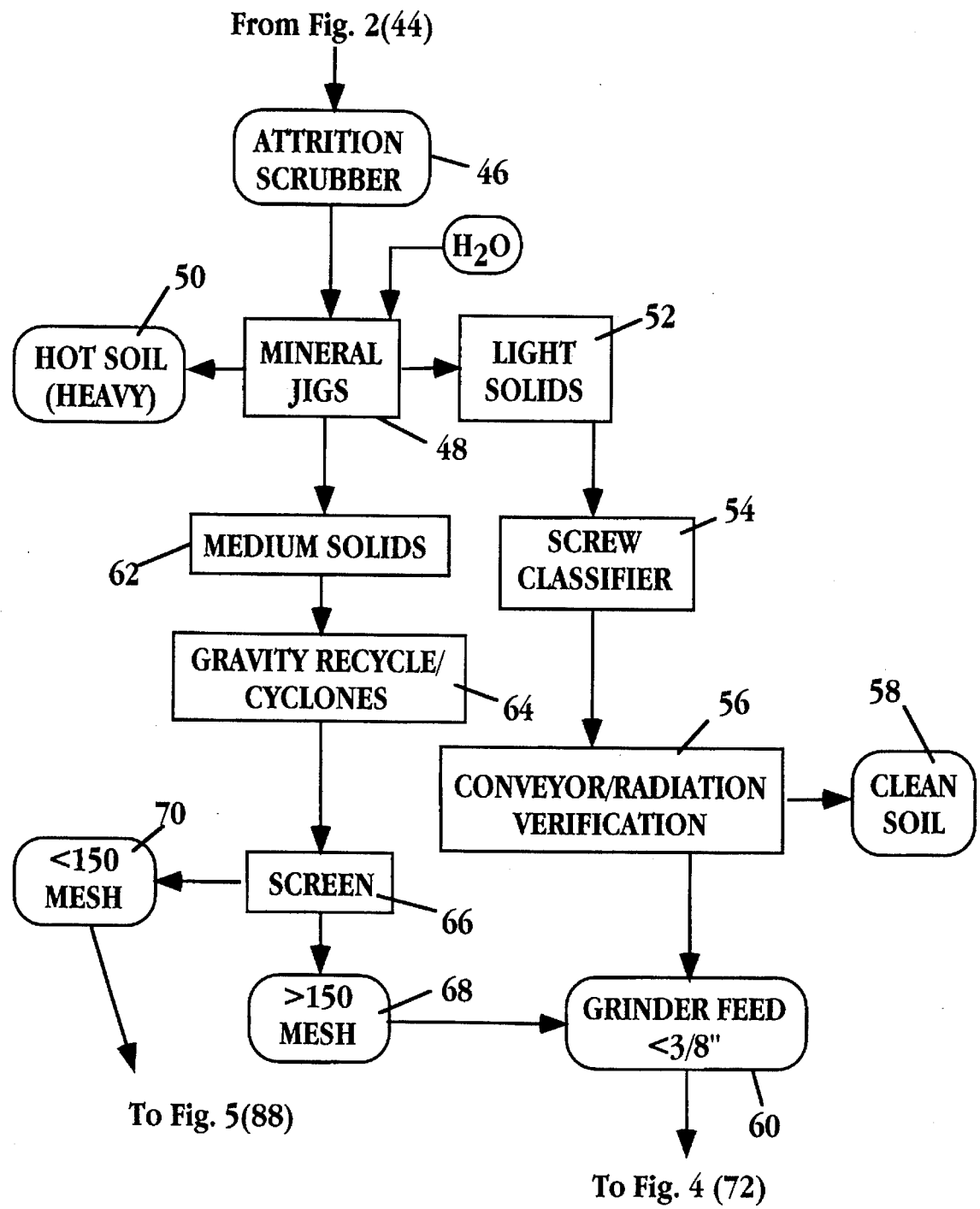

With reference now to FIG. 3, the scrubber discharge is passed through a series of gravimetric separators, such as a mineral jig 48. The jig serves as a selective mineral separator, and is based on a process for separating minerals of differing densities by means of stratification in water. Stratification of the particles is enhanced by means of an intermittent pulsation of the water in the vertical plane. This results in a layered arrangement of particles, with the less dense particles disposed toward the top, and the more dense particles toward the bottom for selection and subsequent removal. For a description of gravimetric flow size separators, see U.S. Pat. Nos. 4,783,253, 5,128,068, and 5,045,240, the contents of which are herein expressly incorporated by reference.

When more than one flow size separator is used for the separations procedure, the upward flow water velocities of different jigs may be set to different values, depending on the nature of the feed and the ultimate size separations desired. With respect to the flow of both the effluent and the wash water, the gravimetric flow size separators may be operated in either co-current or counter-current flow modes.

The bottom fraction of the mineral jig, which contains high density uranium metals 50, is removed as concentrated radioactive waste for off-site disposal. The top fractions are dewatered, such as by using a series of cyclones or the like, and may become grinder feed for the subsequent crushing/grinding process.

The top fractions from the gravity separation 52 are fed to a screw classifier/conveyor 54 and forwarded to radiation verification 56. Clean soil 58 is released to the environment; material having levels of radioactivity exceeding 35 pCi/g is accumulated and ultimately becomes feed for the crushing/grinding system 60. Medium density particles 62 resulting from the gravity separation are subjected to an additional gravity recycle loop in which the slurry is spun down in a series of cyclones 64 and the recovered solids are passed through a screen or any suitable sieving device 66 and separated. Particles greater than 150 mesh (105 micron) 68 become feed for the subsequent crushing and grinding process; particles smaller than 150 mesh 70 become feed to the first leach process 88.

Figure 4:
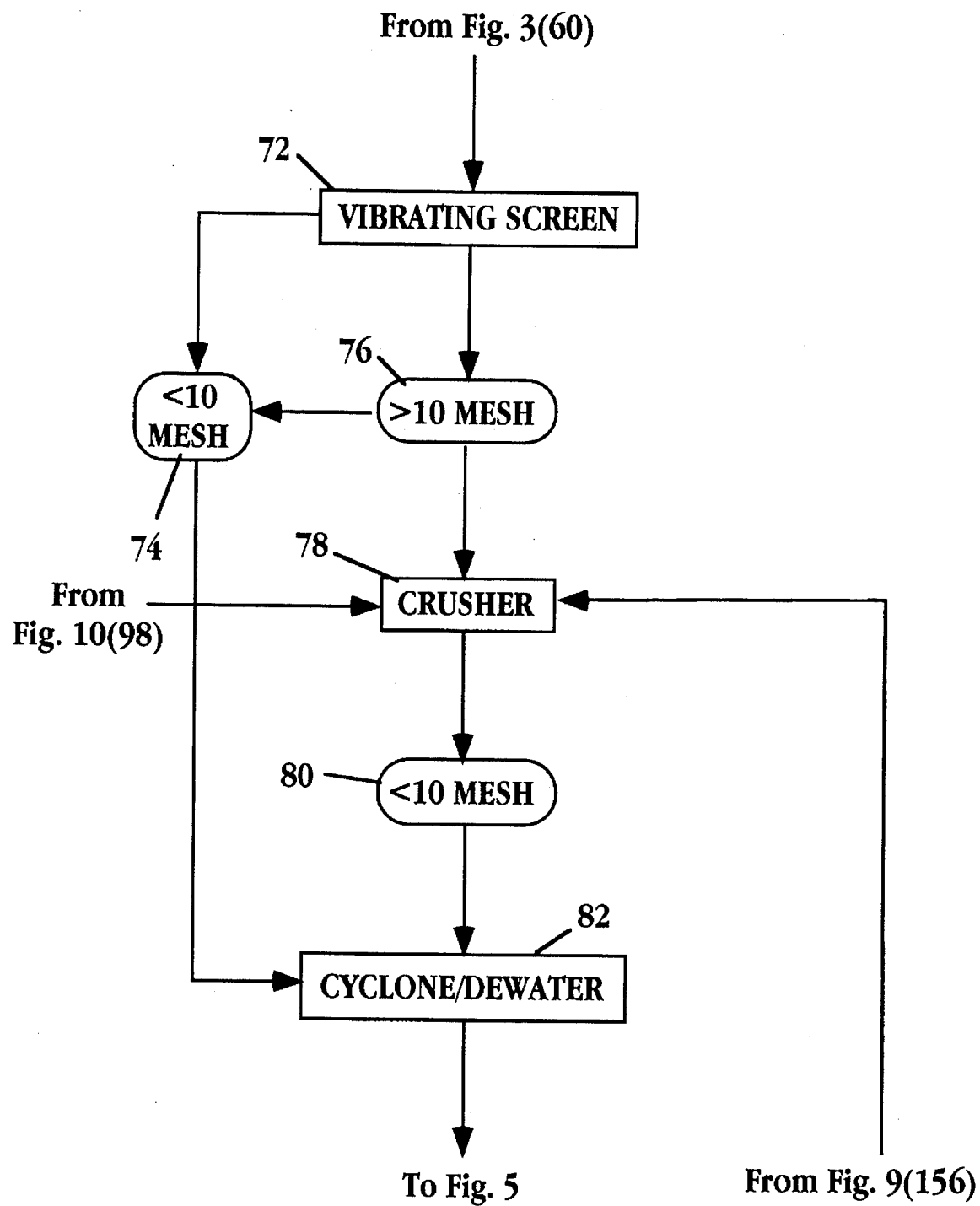
FIG. 4 is a process flow diagram showing sizing, crushing and dewatering steps in soil pretreatment.

Following pre-treatment, the contaminated soil is further sized according to one aspect of the present invention, as illustrated in FIG. 4 and also referred to as Feed Sizing in FIG. 1. Following verification of radioactive contamination, the contaminated waste material sized less than ⅜ inches 60 is fed by means of a conveyor to a vibrating screen or similar mechanical size separation device 72, where it is slurried with recirculated water. Particles less than 10 mesh (1680 microns) 74 in size pass through the screen while the larger particles, greater than 10 mesh in size 76, are delivered to a granulation apparatus and crushed to sizes less than about 10 mesh using a custom impact crusher 78. The slurry of crushed particles 80 is optionally pumped to a cyclone or a similar apparatus for dewatering 82 prior to acid leaching.

In the present process, two-stage acid leaching is utilized to remove depleted uranium from contaminated particulate feed. The inventors have discovered that by employing two-stage leaching to separately leach uranium from the coarse particulate (sand) and fine particulate (slime) fractions, significant improvements are obtained in the amount of uranium removed from the contaminated soil.

Leaching is a process by which uranium present in the soil is dissolved in an acidic solution and separated from the parent soil. In the present process, the soil or particulate matter sized less than about 10 mesh undergoes first-stage leaching 88 by treatment with acid and an oxidizing agent in the presence of a catalyst as summarized in FIG. 1.

Figure 5:
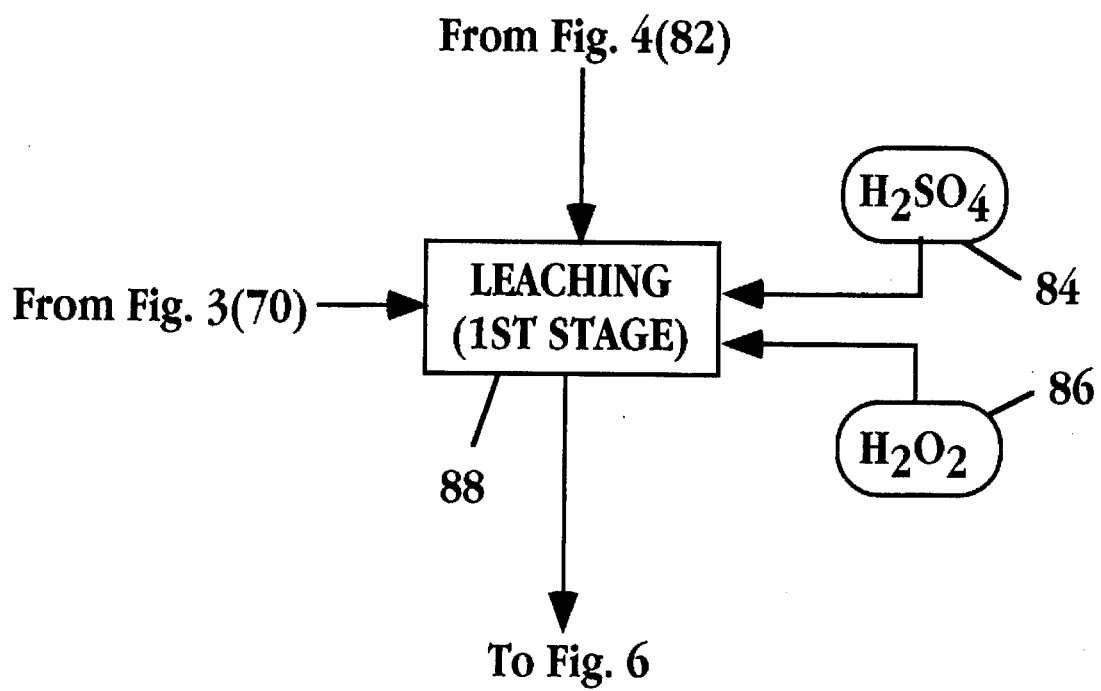
FIG. 5 is a process flow diagram of the initial leaching step in one embodiment of the method of the invention.

The first-stage leaching process is shown in detail in FIG. 5 whereby the coarse particulate slurry of particulate matter less than 10 mesh in size is formed in an aqueous medium containing acid, an oxidizing agent such as hydrogen peroxide, and iron. The leaching process may be carried out in a series of leaching tanks or alternatively in a fluidized bed reactor.

Leaching reagents for use in the present invention include acids such as hydrochloric acid, nitric acid, sulfuric acid, and the like. Iron serves as the catalyst in the leaching procedure. Recycled iron precipitate and metallic iron from attrition of the impact crusher 78 serve to provide the iron catalyst used in the leaching process.

Hexavalent oxides of uranium dissolve readily in acid to form $UO_2^{2+}$ salts; however, uranium ions in aqueous solution can form a number of complex species depending upon the counter ions present in solution, acid and uranium concentration, temperature and the like (Cotton, Merrit). Uranium present in tetravalent form must be oxidized before dissolution can occur. In light of the above, the inventors have discovered that a preferred leaching solution for use in the present invention is an aqueous solution of sulfuric acid ($H_2SO_4$) and hydrogen peroxide ($H_2O_2$) as an oxidant 84, 86.

The pH of the aqueous coarse particulate slurry is preferably adjusted to below 1.5, and more preferably maintained within a range between about 1.0 and 1.4. The oxidation-reduction potential of the leaching slurry is maintained between 300 and 600 -mV and more preferably between about 400 and 600 -mV. It is important for the pH of the leaching slurry to be maintained below 1.5. Addition of hydrogen peroxide to a uranyl solution at pH 2.5–3.5 results in the formation of an insoluble yellow precipitate, of formula approximately $UO_4 \cdot 2H_2O$. Thus, in order to effectively extract the uranium from the soil by acid leaching and thereby maintain the uranium components in solution, it is important to maintain the pH of the slurry within the appropriate range.

In a preferred embodiment of the present invention which uses a sulfuric acid-hydrogen peroxide leaching solution, the selection of leaching reagents offers several benefits over commonly employed oxidants. Oxidants commonly used in uranium acid leaching processes include manganese dioxide and sodium chlorate with a ferrous sulfate catalyst. The use of both manganese dioxide and ferrous sulfate produces undesirable heavy metal contaminants in the process water. The use of sodium chlorate produces chloride ions, concentrations of which may build up in the water recycle loop and lead to corrosion or require the use of extremely costly corrosion resistant pipe. Additionally, the presence of chloride ion acts as a competing ion in alkaline ion exchange processes. In contrast, both sulfuric acid and hydrogen peroxide are relatively inexpensive reagents; additionally, upon oxidation or even thermal decomposition, hydrogen peroxide forms environmentally benign products, in the former case, water, and in the latter, water and oxygen gas. No additional solid waste is generated, which eases not only disposal concerns but also removes the need for additional solids processing steps.

Figure 6:
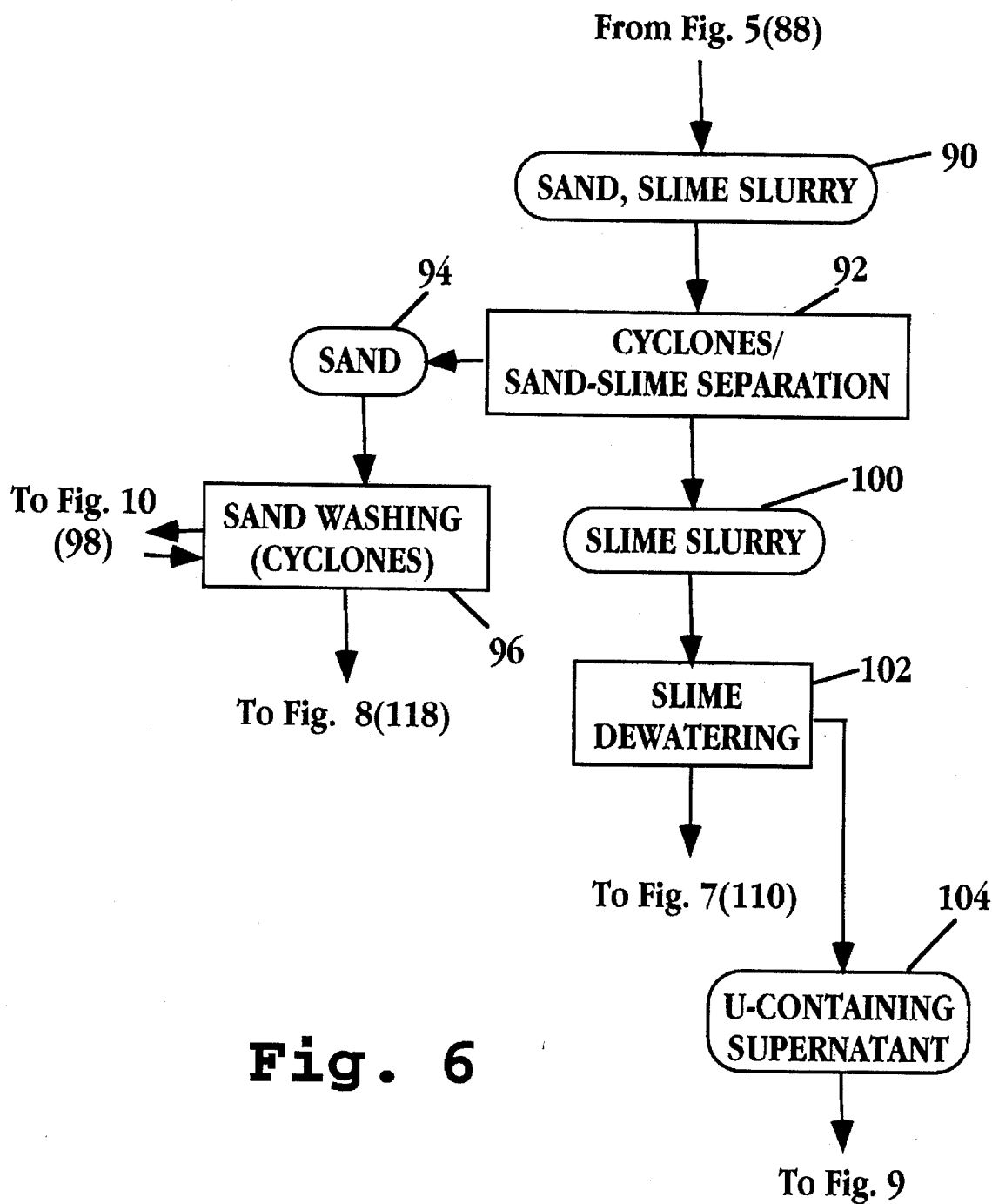
FIG. 6 is a process flow diagram showing steps in the separation of uranium-containing supernatant from the initial-stage acid leaching.

FIG. 6 illustrates a portion of the Solids Separation process referred to in FIG. 1. The combined sand and slime fractions of the slurry resulting from first-stage acid leaching 90 are delivered to a cyclone or series of cyclones 92 for separation and washing. The cyclone underflow, or sand fraction 94, is washed in a series of cyclones 96 using a countercurrent flow configuration of clarified water from storage 98. The sand wash water may be acidified if necessary. After the countercurrent sand wash cycle, the wash water is recycled back to the first leaching system The uranium bearing slime fraction 100 separated as cyclone overhead in the sand-slime separation 92 is dewatered using a centrifuge or similar dewatering apparatus.

Figure 7:
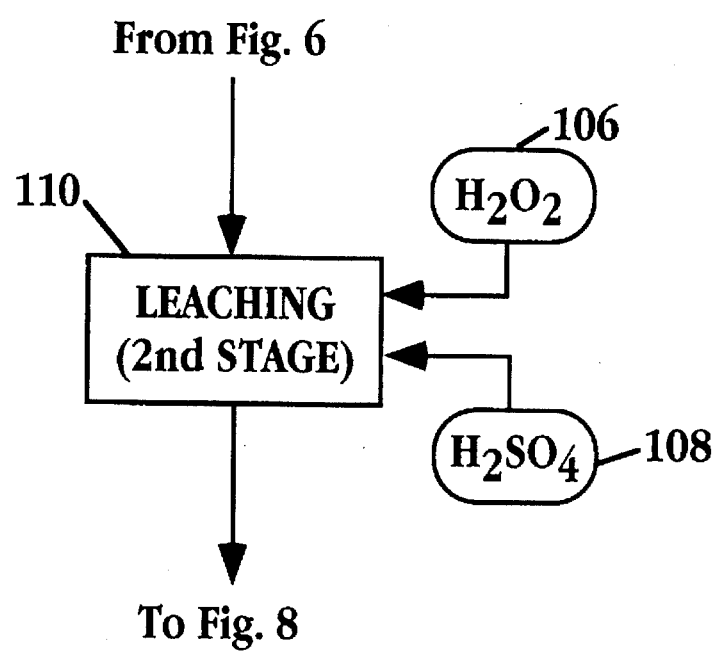
FIG. 7 is a process flow diagram illustrating a second-stage acid leaching of a fine particulate fraction with acid, hydrogen peroxide and iron to remove residual uranium.

As shown in FIG. 7, the dewatered slime or fine particulate matter is then further treated in a second-stage leaching process 110 to extract remaining uranium. The inventors have discovered that by employing a second-stage leaching step, the most optimum leaching of the two soil fractions is achieved without the overuse of chemical additives.

As in the first-stage leaching, a number of leaching agents may be used to further remove depleted uranium from the fine particulate matter; in a preferred embodiment, the leaching reagents are the same as those employed in the first-stage leaching 88. Most preferably, the leaching solution comprises an iron-containing aqueous solution of sulfuric acid 108 and hydrogen peroxide 106. The pH of the second-stage fine particulate slurry is preferably adjusted to below 1.0, and more preferably maintained within a range between about 0.5 and 1.0. The oxidation-reduction potential of the fine particulate leaching slurry is maintained between 300 and 600 -Mv and more preferably between about 400 and 600 -Mv.

FIG. 8 details the remainder of the Solids Separation process referred to in FIG. 1 of the drawings and whereby clean soil is ultimately released to the environment. After second-stage leaching, the slime slurry is dewatered using a centrifuge or similar dewatering device, and the slime is further washed with clarified, reclaimed water 98 in a wash circuit containing a series of centrifuges arranged in a countercurrent flow configuration 114. The slime wash water may be acidified if necessary.

The clean slime from the wash circuit (centrifuge bottoms) is pumped to the neutralization tank 118 and may be combined with the clean sand fraction for neutralization. Any of a number of neutralizing agents 117 may be used in the neutralization step, such as caustic (NaOH), lime (CaO) or soda ash ($Na_2CO_3$). A preferred alkali for use in the present process is lime. The combined clean soil portions are then verified to contain sufficiently low levels of radioactivity 120 to allow safe release to the environment, i.e., below 35 pCi/g. If the soil is found to contain unacceptable levels of uranium, the soil is then subjected to additional treatment. Upon verification for safe release to the environment, the clean combined slurry is pumped to a classifier or the like for de-sanding 122. The overflow of the classifier contains the slime fraction 124, which is fed to a centrifuge for dewatering or desliming 126. The underflows of 122 and 126, the clean sand 142 and clean slime 128 portions respectively, are blended 144 and released to the environment 146.

One unique and important aspect of the present invention is the reclamation and treatment of process water for re-use in the process. The process uses a closed loop for process water to minimize fresh water consumption. This aspect of the invention is both economical and advantageous, especially for use in arid regions or settings where fresh water supplies are limited.

In one aspect of uranium removal, as illustrated in FIG. 9, uranium is recovered in a sequential or two-stage precipitation procedure. The uranium bearing solutions or supernatants, 104 and 116, are treated in a two-stage direct precipitation to recycle iron and extract uranium. Optionally, a portion of the slime wash solution 116 may be recycled to the first-stage leaching circuit 88 to recycle chemical reagents.

The overhead or supernatant from slime dewatering 104 and the overflow of the slime wash circuit 116 are optionally combined in a precipitation tank or the like. In the first-stage precipitation 150, the pH of the uranium bearing solution is raised to between about 4.0 and 4.5 by addition of base 148. Any of a number of basic reagents may be utilized to raise the pH of the solution including calcium oxide, calcium hydroxide, sodium hydroxide, sodium carbonate, magnesium oxide or anhydrous ammonia. Particularly preferred reagents for use in the present invention are magnesium oxide and anhydrous ammonia.

The choice of magnesium oxide or magnesium hydroxide (the active species in water) as a precipitating agent provides several advantages. From a safety standpoint, magnesium hydroxide is comparable to a concentrated milk of magnesia product, and may be classified as a low-degree health hazard with respect to handling concerns. Taking into account the respective molecular weights and percent hydroxide per alkaline reagent, fewer pounds of magnesium hydroxide and therefore less storage volume is required to neutralize a given volume of acid than for either for lime or for caustic; similarly, less dissolved magnesium salt product is generated. When magnesium hydroxide is used to neutralize acidic streams containing diverse ions, the resulting solution can only obtain a maximum pH of 9.0; this upper pH limit coincides with that cited in the Clean Water Act of 1976 (Teringo). Lastly, because magnesium hydroxide is sparingly soluble and in equilibrium with water, hydroxyl ions must be consumed by acid before more magnesium hydroxide is solubilized. When using the addition of magnesium hydroxide to precipitate a given metal, the pH of the solution will increase to the level at which that metal precipitates and remain at that pH until the metal is removed before proceeding upward to the next metal precipitation pH. This aspect provides a very useful monitoring capability when trying to achieve selective metals removal. Similarly, the use of anhydrous ammonia minimizes the volume of radioactive waste generated for disposal and eliminates the need for solids addition steps. The ammonium salts produced as a by-product of ammonia-promoted neutralization are also considered to be relatively harmless to the environment.

Returning to FIG. 9, iron salts contained in the uranium bearing solution are precipitated upon raising the pH in the first precipitation step 150. The resulting iron-containing slurry 152 is clarified 154 and the underflow, which comprises precipitated iron oxides and the like, 156, is recycled back to crushing 78 for use in the leaching process.

The overflow from the clarification step 154, which contains solubilized uranium 158, is forwarded to a second-stage precipitation procedure 160 in which the pH of the solution is increased to between about 6.5 and 7.0 to precipitate insoluble uranium salts. The uranium precipitate, now greatly decreased in volume over the original contaminated matter, is dewatered 162 using a centrifuge or similar type dewatering device. The resulting underflow from 162, which typically forms a solid yellow cake, comprises the radioactive waste 166 collected for off-site disposal.

Figure 10:
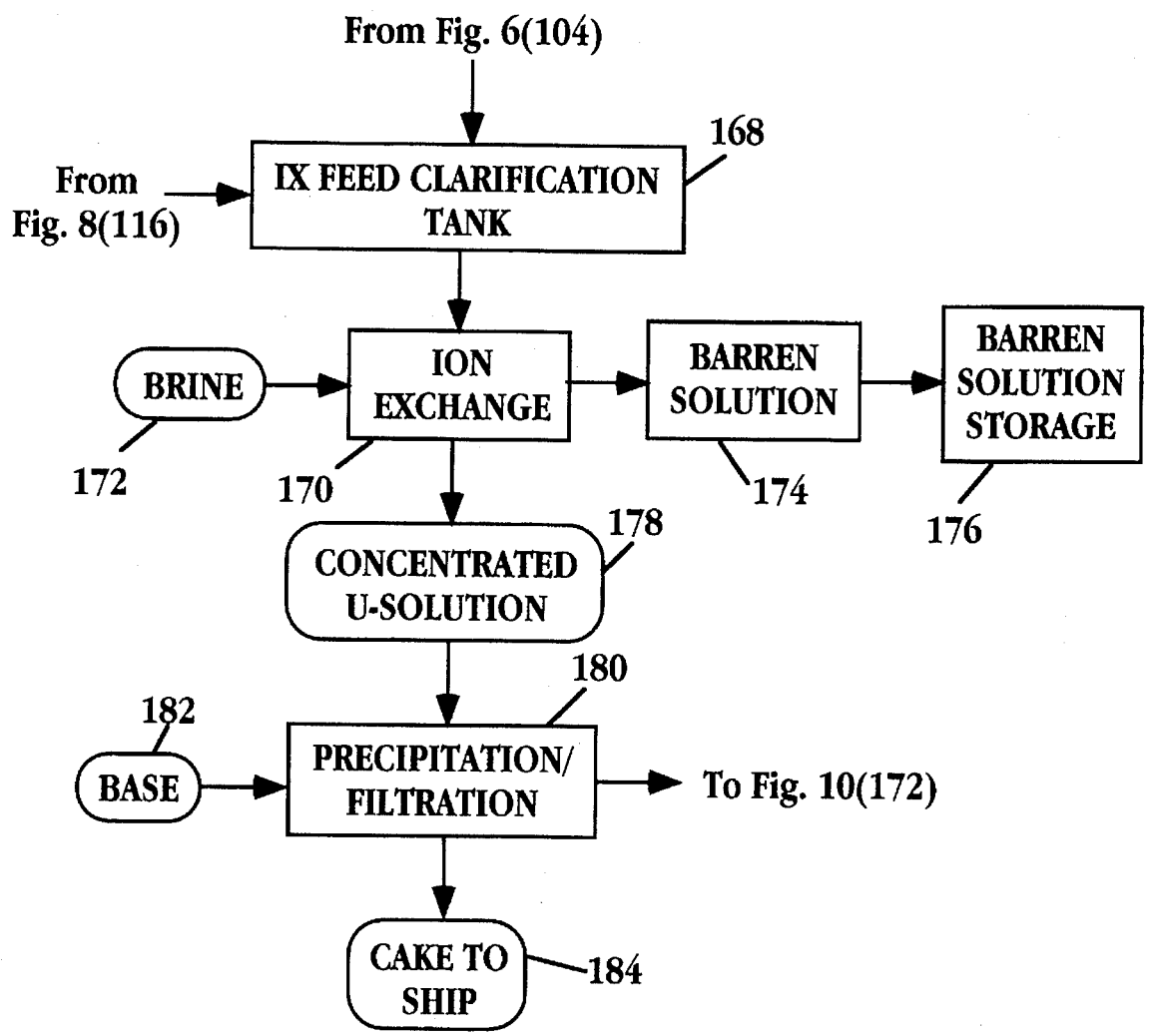
FIG. 10 is a process flow diagram showing removal of uranium from first- and second-stage leaching supernatants, in accordance with another general embodiment of the invention.

In an alternate embodiment of the invention illustrated in FIG. 10, the uranium bearing solutions (the overhead from slime dewatering 102 and the overflow 116 of the slime wash circuit 114) are fed to an ion-exchange (IX) clarification tank 168. The uranium bearing solutions may optionally be treated for iron removal prior to removal of uranium by ion-exchange. One such possible treatment for removal of iron is precipitation with alkali as previously described.

The clarified solution is then passed through an ion exchange column or ion exchange bed 170 to selectively adsorb dissolved uranium. Ion exchange materials for use in the present invention include cationic resins such as those which contain sulfonic functional groups attached to a styrene copolymer or the like, such as AMBERLITE IR-120 (Rohm and Haas, Philadelphia, Pa.) or alternatively, anionic resins such as styrene or styrene divinylbenzene copolymers functionalized with quaternary ammonium groups such as AMBERLITE IRA 400 (Rohm and Haas, Philadelphia, Pa.). A preferred anionic exchange resin is DOWEX 21 K (Dow Chemical Company). The barren solution 174, which contains very low concentrations of uranium, from about 1–10 ppm, is stored 176 for recirculation as wash water for the leached sand and slime slurries.

Uranium is released from the ion-exchange material by displacement with a small volume of brine 172 or any other suitable ion-containing solution capable of displacing uranium from the active sites in the resin. The pH of the uranium concentrate 178 is adjusted with alkali 183 such as lime, preferably with ammonia or magnesium oxide, to a pH sufficient to precipitate the uranium salts 180, preferably to a pH of between about 6.5 and 7.0. The uranium salts are then filtered 180 from the liquid phase using a filter press or other similar filtration means and recovered as solid cake for disposal 184. The brine solution 172 may optionally be recycled following removal of uranium to minimize costs and adverse environmental impact.

Figure 11:
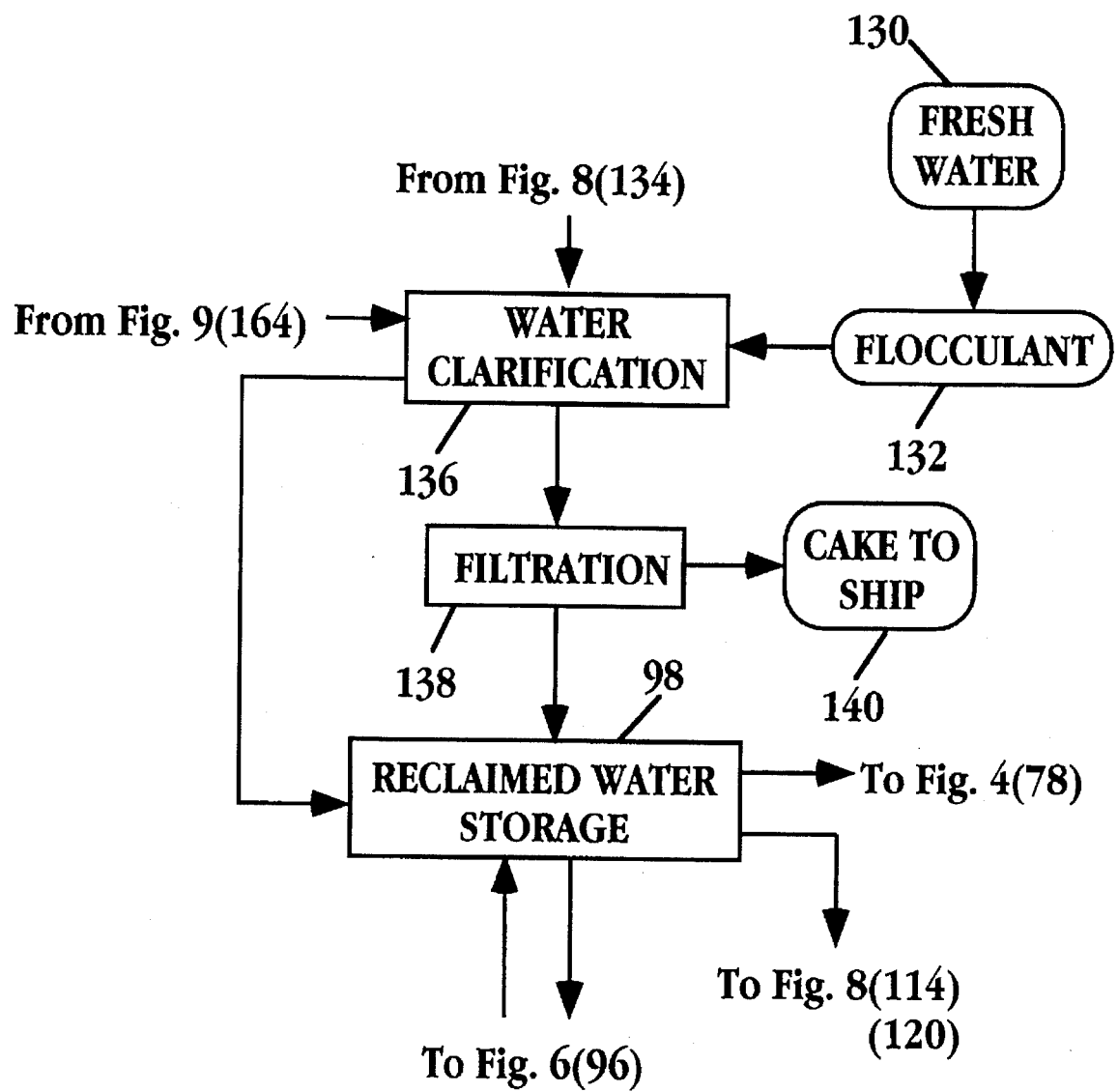
FIG. 11 is a process flow diagram showing water treatment and reclamation steps in the method of the invention.

FIG. 11 shows the details of water treatment and reclamation. The reclaimed water overflow 134 from 126 is pumped to a tank for clarification 136. The balance of the reclaimed water is recirculated for use in crushing 78 and for use as sand and slime wash water, 96 and 114 respectively. Additionally, a small volume is recycled for use in radiation verification 120 to provide a total closed system of water recirculation. After an optional filtration step 138, the clarified water is stored 98 for recirculation. The solids removed from the filtration procedure 138 are collected for disposal 140. A bypass from 136 to 98 is provided if filtration is found to be unnecessary.

The overflow 164 from the dewatering step 162 is pumped to the reclaimed water tank 136 for clarification and optional filtration 138. A polymer flocculent 132, such as for example, Nalco 7182, an anionic polymer available from Nalco Chemical Company, Naperville Ill., Percol E-10 (Allied Colloids, Suffolk, Va.), or the like (Oliver) may be added to the reclaimed water to aid in clarification. Flocculent may also optionally be added to assist in slime dewatering 102, 114, 126, and yellow cake dewatering 162.

The following examples of treatment of soil contaminated with depleted uranium are intended to illustrate, but in no way limit the invention.

EXAMPLE 1

Soil contaminated with uranium was treated according to one embodiment of the present invention as shown in FIGS. 2–9, 11. A dry soil mass flow feed rate of 6.0 tons per hour (TPH) was used. The uranium levels in the contaminated soil averaged 600 to 1500 ppm, based on acid digestion of dry solids followed by laser kinetic phosphorimeter analysis (KPA). Uranium was removed from the soil in a two-stage direct precipitation process utilizing anhydrous ammonia as the precipitating agent as shown in FIG. 9.

At the first-stage leaching step, the pH of the slurry was adjusted to between 1.0 and 1.4 using $H_2O_4$, while the oxidation-reduction potential (ORP) of the system was maintained between 400 and 600 -mV using a 50% aqueous solution of $H_2O_2$. The oxidation-reduction potential was measured with platinum and saturated calomel electrodes. The most highly oxidized solution was arbitrarily defined to have the most negative potential. At the second-stage leaching or slime leaching step, the pH was maintained at between 0.5 and 1.0, while the ORP was maintained between 400 and 600 -mV.

Subsequent to leaching and washing, the clean sand discharge was found to contain less than 30 ppm residual uranium; the clean slime discharge was similarly found to contain less than 65 ppm residual uranium, based upon solid acid digestion and KPA measurements. After second-stage direct precipitation, the recycled process water was found to possess uranium levels of 0.1–10 ppm by KPA measurements. Fresh water consumption, required to make up for losses due to water entrainment in discharged soil and waste, was minimal—less than 75 gallons per ton of soil processed. The overall volume reduction of radioactive waste for off-site disposal resulting from the process ranged from 86–92%.

Results from the processing of uranium-contaminated soil as described in Example I above are summarized in Table I.

TABLE I

| | |
|---|---|
| Feed flow rate | 6 TPH |
| U levels in untreated soil | 600–1500 ppm |
| U levels in treated sand fraction | <30 ppm |
| U levels in treated slime fraction | <65 ppm |
| U levels in recycled process water | 0.10–10 ppm |
| Fresh water consumption | <75 gallons per ton of feed |
| overall volume reduction of radioactive waste for disposal | 86–92% |

EXAMPLE 2

Soil contaminated with uranium was treated according to one embodiment of the invention as described in Example 1 above. Solids mass balance flow rates for relevant process streams were determined in units of tons per hour (TPH). Table II provides a compilation of dry base solid mass flow rates in units of TPH.

A summary of the overall solids mass balance for the process is given in Table III. Sources of solids entering the process stream are given in column 1; sources for solids losses are outlined in column 3.

TABLE II

SOLID MASS FLOW RATES

| Process Stream | Solid Mass Flow Rates, TPH (tons per hour) |
|---|---|
| To Crushing, (78) | |
| from grinder feed, (60) | 6.00 |
| from clarification, (154) | 0.04 |
| To First-Stage Leaching, (88) | |
| from crushing, (82) | 6.04 |
| from slime washing, (114) | 0.06 |
| from reagents, (84), (86) | 0.24 |
| from sand washing, (96) | 0.10 |
| To Sand-Slime Separation, (92) | 6.44 |
| from leaching, (90) | |
| To Slime Dewatering, (102) | 1.34 |
| from sand-slime separation, (92) | |
| To Sand Washing, (96) | 5.10 |
| from sand-slime separation, (92) | |
| To Second-Stage Leaching, (110) | |
| from reagents: (106), (108) | 0.10 |
| from slime dewatering, (102) | 1.30 |
| To Slime Washing, (114) | 1.40 |
| from second-stage leaching, (110) | |
| To Neutralization, (118) | |
| from slime washing, (114) | 0.90 |
| from sand washing, (96) | 5.00 |
| from base, (117) | 0.02 |
| To Verification, (120) | 5.92 |
| from neutralization, (118) | |
| To Desanding, (122) | 5.92 |
| from verification, (120) | |
| To Desanding, (126) | 0.92 |
| from desanding, (122) | |
| To Blending, (144) | |
| from dewatering, (128) | 0.88 |
| from desanding, (142) | 5.00 |
| To Clean Soil, (146) | 5.88 |
| from blending, (144) | |
| To Precipitation I, (150) | |
| from slime dewatering, (102) | 0.04 |
| from slime washing, (114) | 0.44 |
| from base, (148) | 0.15 |
| To Precipitation II, (160) | |
| from base, (148) | 0.11 |
| from clarification, (154) | 0.59 |
| To Clarification, (154) | 0.63 |
| from precipitation I, (150) | |
| To Dewatering, (162) | 0.70 |
| from precipitation II, (160) | |
| To Reclaimed Water Clarification, (136) | |
| from dewatering, (162) | 0.03 |
| from dewatering, (126) | 0.04 |
| To Filtration, (138) | 0.03 |
| from water clarification, (136) | |
| To Cake to Ship, (166), (140) | |
| from dewatering, (162) | 0.71 |
| from filtration, (138) | 0.03 |

TABLE III

Overall Mass Balance of Solids

| SOLIDS IN Materials | SOLIDS IN Flow Rate (TPH) | SOLIDS OUT Materials | SOLIDS OUT Flow Rate (TPH) |
|---|---|---|---|
| Contaminated Soil, (60) | 6.00 | Clean soil, (142) | 5.88 |
| Leaching reagent (1st stage), (84), (86) | 0.24 | Filter Cake, (166) | 0.71 |
| Leaching reagent (2nd stage), (106), (108) | 0.10 | Precipitate from filtration, (140) | 0.03 |
| Precipitation I reagent, (148) | 0.15 | | |
| Precipitation II reagent, (148) | 0.11 | | |
| Lime, (117) | 0.02 | | |
| TOTAL IN | 6.62 | TOTAL OUT | 6.62 |

EXAMPLE 3

Soil contaminated with uranium was treated according to one embodiment of the invention as described in Example 1 above. Water mass balance flow rates were determined in units of gallons per minute (GPM) for relevant process streams as illustrated in Table IV.

Nearly 70 GPM of reclaimed water was recirculated in the process. Clarified water from storage was utilized directly in crushing (20.91 GPM), sand washing (20.00 GPM), slime washing (22.07 GPM), and verification (4.22 GPM). Upon examining the water flow rates, the ratio of recirculated water used in crushing, sand and slime washing, and verification to incoming fresh water was about 67 to 7 or 9:1.

A summary of the overall water balance is shown in Table V. In addition to recirculating water, some water enters the process from indirect sources, as noted in columns 1 and 2 of Table V. Water is lost during the process at various stages, as shown in columns 3 and 4 of Table V. A minimal amount of fresh water (7.46 GPM) is used in the process to compensate for water losses due to entrainment in soil and waste as shown in Table V.

TABLE IV

WATER FLOW RATES

| Process Stream | Water Flow Rates, GPM (gallons per minute) |
|---|---|
| To Crushing, (78) | |
| from grinder feed, (60) | 2.09 |
| from reclaimed water storage, (98) | 20.91 |
| from clarification, (154) | 8.00 |
| To First-Stage Leaching, (88) | |
| from crushing, (82) | 31.00 |
| from slime washing, (114) | 4.18 |
| from reagents, (84), (86) | 0.26 |
| from sand washing, (96) | 22.43 |
| To Sand-Slime Separation, (92) | 57.87 |
| from leaching, (90) | |
| To Slime-Dewatering, (102) | |
| from sand-slime separation, (92) | 41.83 |
| from flocculent, (132) | 1.00 |

TABLE IV-continued

WATER FLOW RATES

| Process Stream | Water Flow Rates, GPM (gallons per minute) |
|---|---|
| To Second-Stage Leaching, (110) | |
| from slime dewatering, (102) | 17.60 |
| from reagents, (106), (108) | 0.11 |
| To Sand Washing, (96) | |
| from sand-slime separation, (92) | 16.03 |
| from reclaimed water storage, (98) | 20.00 |
| To Slime Washing, (114) | |
| from second-stage leaching, (110) | 17.71 |
| from flocculant, (132) | 3.46 |
| from reclaimed water storage, (98) | 22.07 |
| To Neutralization, (118) | |
| from sand washing, (96) | 13.60 |
| from slime washing, (114) | 3.60 |
| To Verification, (120) | |
| from neutralization, (118) | 17.20 |
| from reclaimed water storage, (98) | 4.22 |
| To Desanding, (122) | 21.42 |
| from verification, (120) | |
| To Dewatering, (126) | |
| from desanding, (122) | 16.92 |
| from flocculant, (132) | 1.00 |
| To Blending, (144) | |
| from dewatering, (126) | 3.95 |
| from desanding, (122) | 4.50 |
| To Clean Soil, (146) | 8.45 |
| from blending, (144) | |
| To Precipitation I, (150) | |
| from slime washing, (114) | 35.46 |
| from slime dewatering, (102) | 25.24 |
| To Clarification, (154) | 60.70 |
| from precipitation I, (150) | |
| To Precipitation II, (160) | 52.70 |
| from clarification, (154) | |
| To Dewatering, (162) | |
| from precipitation II, (160) | 52.70 |
| from flocculant, (132) | 1.00 |
| from water clarification, (136) | 2.00 |
| To Water Clarification, (136) | |
| from dewatering, (162) | 54.28 |
| from flocculant, (132) | 1.00 |
| from dewatering, (126) | 13.97 |
| To Filtration, (138) | 67.25 |
| from water clarification, (136) | |
| To Reclaimed Water Storage, (98) | 67.20 |
| from filtration, (138) | |
| To Flocculant, (132) | 7.46 |
| from fresh water, (130) | |
| To Cake to Ship, (168), (140) | |
| from dewatering, (162) | 1.42 |
| from filtration, (138 | 0.05 |

TABLE V

Overall Water Balance

| WATER IN Source Streams | WATER IN Flow Rate (GPM) | WATER OUT Exit Streams | WATER OUT Flow Rate (GPM) |
|---|---|---|---|
| Feed Soil Moisture, (60) | 2.09 | Wet cake moisture from dewatering, (162) | 1.42 |
| Leaching reagent (1st) | 0.26 | Wet cake moisture from filtration, (140) | 0.05 |
| Leaching reagent (2nd) | 0.11 | Clean slime moisture, (128) | 3.95 |
| Fresh water | 7.46 | Clean sand moisture, (142) | 4.50 |
| TOTAL IN | 9.92 | TOTAL OUT | 9.92 |

While various embodiments of the invention have been described herein, it will be apparent that various modifications can be made without departing from the intended scope of the invention.

We claim:

1. A method for use in removing uranium from soil containing metallic uranium billets, soil particles greater than about ⅜ inch in size, and soil particles less than about ⅜ inch in size, comprising the steps of:

a) removing from the soil, soil particles greater than ⅜ inch in size, b) scrubbing the removed soil particles from step (a), c) removing the metallic uranium billets by gravimetric separation, d) crushing the remaining soil particles to 10 mesh or less, e) forming a first slurry of the crushed soil particles in an aqueous medium containing water, acid, hydrogen peroxide and iron, thereby to leach uranium from said particles, f) removing coarse particles in the first slurry, g) after said removing, treating the first slurry to produce a first uranium-containing supernatant and fine particles, h) forming a second slurry composed of the fine particles in an aqueous medium containing water, acid, hydrogen peroxide and iron, thereby to leach uranium from the fine particles, i) removing the fine particles in the second slurry to form a second supernatant, j) extracting uranium from the first and second supernatants, and, k) after said extracting, treating said first and second supernatants for reuse as reclaimed water in at least one of steps (e) and (h).

2. A method for removing uranium from particulate matter, comprising the steps of:

a) forming a first slurry of the particulate matter in an aqueous medium containing water, acid, hydrogen peroxide and iron, thereby to leach uranium from the particulate matter, b) removing coarse particles in the first slurry, c) after said removing, treating the first slurry to produce a first uranium-containing supernatant and fine particles, d) forming a second slurry composed of the fine particles in an aqueous medium containing water, acid, hydrogen peroxide and iron, thereby to leach uranium from the fine particles, e) removing the fine particles in the second slurry to form a second supernatant, f) extracting uranium from the first and second supernatants by (i) raising the pH of the first and second supernatants to a level between about 4 and 4.5 by addition of anhydrous ammonia or MgO, to precipitate iron, but not uranium, (ii) removing the precipitated iron from the supernatants, (iii) raising the pH of the supernatants to a level between about 6.5 and 7 by addition of anhydrous ammonia or MgO, to effect precipitation of uranium, (iv) removing precipitated uranium from the supernatants, and, g) after said extracting, treating said first and second supernatants for reuse as reclaimed water in at least one of steps (a) and (d).

3. A method for removing uranium from particulate matter, comprising the steps of:

a) forming a first slurry of the particulate matter in an aqueous medium containing water, acid, hydrogen peroxide and iron, thereby to leach uranium from the particulate matter, b) removing coarse particles in the first slurry, c) after said removing, treating the first slurry to produce a first uranium-containing supernatant and fine particles, d) forming a second slurry composed of the fine particles in an aqueous medium containing water, acid, hydrogen peroxide and iron, thereby to leach uranium from the fine particles, e) removing the fine particles in the second slurry to form a second supernatant, f) extracting uranium from the first and second supernatants by (i) passing the supernatants over an ion exchange material, (ii) washing said ion-exchange material with brine to form a uranium concentrate, (iii) raising the pH of the uranium concentrate to a level effective to precipitate uranium by addition of alkali selected from the group consisting of lime, ammonia, and magnesium oxide, (iv) removing precipitated uranium in the concentrate to form a supernatant, and, g) after said extracting, treating said first and second supernatants for reuse as reclaimed water in at least one of steps (a) and (d).

4. A method for removing uranium from particulate matter, comprising the steps of:

a) forming a first slurry of the particulate matter in an aqueous medium containing water, sulfuric acid, hydrogen peroxide and iron, maintained at a pH of 1.5 or below, thereby to leach uranium from the particulate matter, b) removing coarse particles in the first slurry, c) after said removing, treating the first slurry to produce a first uranium-containing supernatant and fine particles, d) forming a second slurry composed of the fine particles in an aqueous medium containing water, sulfuric acid, hydrogen peroxide and iron, maintained at a pH of 1.0 or below, thereby to leach uranium from the fine particles, e) removing the fine particles in the second slurry to form a second supernatant, f) extracting uranium from the first and second supernatants, and, g) after said extracting, treating said first and second supernatants for reuse as reclaimed water in at least one of steps (a) and (d).

* * * * *